Figure 1:
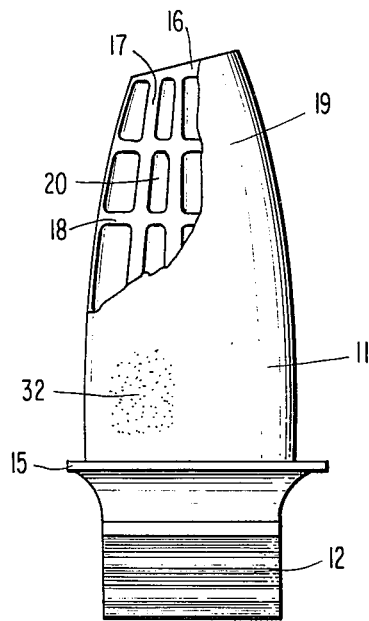

United States Patent [19]
Albrecht

[11] 3,950,113
[45] Apr. 13, 1976

[54] TURBINE BLADE
[75] Inventor: Günther Albrecht, Esslingen am Neckar, Germany
[73] Assignee: Daimler-Benz Aktiengesellschaft, Germany
[22] Filed: Oct. 9, 1970
[21] Appl. No.: 79,548

[52] U.S. Cl. .................... 416/97 A; 416/231 R
[51] Int. Cl.² ............................................ F01D 5/18
[58] Field of Search .................... 416/96, 97, 92, 90

[56] References Cited
UNITED STATES PATENTS

| | | | |
|---|---|---|---|
| 2,843,355 | 7/1958 | Findley | 416/90 |
| 2,853,271 | 9/1958 | Findley | 416/90 |
| 2,858,102 | 10/1958 | Bloomberg | 416/92 |
| 2,931,623 | 4/1960 | Hyde | 416/92 |
| 3,066,910 | 12/1962 | Bluck | 416/92 |
| 3,067,982 | 12/1962 | Wheeler | 416/97 X |
| 3,240,468 | 3/1966 | Watts et al. | 416/96 X |
| 3,402,914 | 9/1968 | Kump et al. | 416/97 X |
| 3,446,480 | 5/1969 | Emmerson et al. | 416/97 X |
| 3,446,481 | 5/1969 | Kydd | 416/96 X |
| 3,468,513 | 9/1969 | Schmitz | 416/97 X |
| 3,567,333 | 3/1971 | De Feo | 416/90 |
| 3,619,076 | 11/1971 | Kydd | 416/96 |
| 3,656,863 | 4/1972 | De Feo | 416/231 X |

FOREIGN PATENTS OR APPLICATIONS

| | | | |
|---|---|---|---|
| 1,801,475 | 4/1970 | Germany | 416/97 |
| 828,552 | 2/1960 | United Kingdom | 416/97 |

*Primary Examiner*—Everette A. Powell, Jr.
*Attorney, Agent, or Firm*—Craig & Antonelli

[57] ABSTRACT

An air-cooled turbine blading whose blade consists of a blade core provided with longitudinal ribs and cross ribs and of a blade jacket abutting against the ribs; the jacket is provided with air discharge apertures for the discharge of the cooling air out of the hollow spaces formed by the respective longitudinal and cross ribs; the cross ribs are provided with apertures for the flow of air which are constructed as throttling places.

9 Claims, 3 Drawing Figures

U.S. Patent  April 13, 1976  3,950,113

INVENTORS
GUNTHER ALBRECHT
BY Craig, Antonelli,
Stewart & Hill
ATTORNEYS

TURBINE BLADE

The present invention relates to an air-cooled turbine vane whose blade consists of a solid blade core provided with longitudinal ribs and of a blade jacket abutting at the same, which is provided with air discharge apertures, and in which a hollow space covered off by a sheet metal member, which is arranged above the web plate thereof and extends up to underneath the hollow spaces formed by the blade core and the blade jacket, is connected with air supply chambers by way of channels or ducts extending through the web plate.

In a prior art construction of such a type of blade which, however, is provided with air discharge apertures exclusively at its end face, a uniform distribution of the cooling air results on the inside of cooling channels which are formed by the core provided with longitudinal ribs and by the jacket of the blade. This type of construction of cooling channels or ducts does not result in an optimum cooling of the blade or vane since the configuration and position thereof in the gas stream lead to a non-uniform temperature distribution at the jacket and in the core of the blade.

It is the purpose of the present invention to eliminate this disadvantage and to provide an air-cooled turbine blade whose jacket is provided with air discharge apertures, which realizes an optimum cooling adapted to the temperature distribution. This is realized according to the present invention in that the blade core additionally includes cross ribs which are provided with recesses or apertures constructed as throttling places for the air passage. The channels disposed between the longitudinal ribs are subdivided by the cross ribs into a large number of hollow spaces, to which cooling air is supplied by way of the recesses or apertures in the cross ribs. A distribution of the cooling air corresponding to the temperature field of the blade can be attained by the number and size of the recesses or apertures.

According to a further feature and construction of the present invention the hollow space above the web plate covered by a sheet metal member is subdivided into individual partial spaces which are in communication each with a hollow space in the blade delimited by two longitudinal ribs and with at least one channel in the web plate. This measure results in a further improvement of the cooling air distribution and therewith of the heat removal by the independent feed of the hollow spaces disposed between two respective longitudinal ribs.

The cooling air distribution may be further influenced in an advantageous manner according to the present invention in that the channels and the web plate are constructed as throttling bores.

Accordingly, it is an object of the present invention to provide a turbine blade which avoids by simple means the aforementioned shortcomings and drawbacks encountered in the prior art.

Another object of the present invention resides in a turbine blade assuring an optimum cooling thereof.

Still another object of the present invention resides in an air-cooled turbine blade which permits an improved distribution of the cooling air to the various parts of the blade.

A further object of the present invention resides in an air-cooled turbine blade of the type described above which is relatively simple to manufacture and assemble yet effectively optimizes the desired cooling effect.

Figure 2:
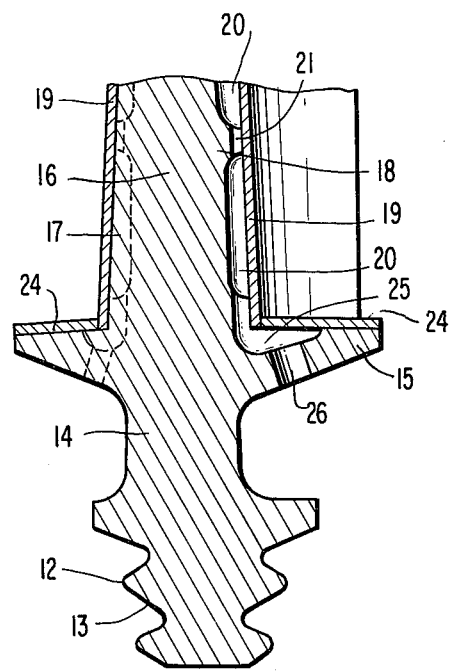
Figure 3:
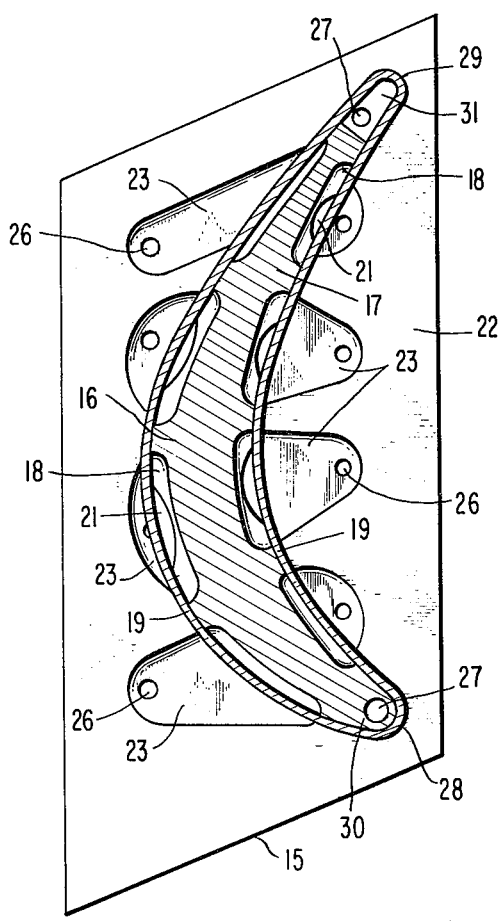

These and further objects, features and advantages of the present invention will become more obvious from the following description when taken in connection with the accompanying drawing which shows, for purposes of illustration only, one embodiment according to the present invention, and wherein FIG. 1 is an elevational view of a turbine blade for a jet engine with a partially broken away blade jacket for the sake of illustrating the blade core, FIG. 2 is a partial longitudinal cross sectional view, on an enlarged scale, through the blade of FIG. 1, and FIG. 3 is a transverse cross sectional view, on an enlarged scale, through the blade of FIG. 1 with the sheet metal cover plate removed.

Referring now to the drawing wherein like reference numerals are used throughout the various views to designate like parts, the turbine vane illustrated in FIG. 1 consists of the blade 11, properly speaking and of the blade base 12 which has a fir-tree profile 13 (FIG. 2). Reference numeral 14 designates the web and reference numeral 15 the web plate of the turbine blade. The blade 11 is made from a solid blade core 16 that is provided with longitudinal ribs 17 and cross ribs 18, and from a thin-walled blade jacket 19. The blade jacket 19 abuts at the ribs 17 and 18 and together with the blade core 16 forms individual hollow spaces 20 which are connected with each other in the longitudinal direction by apertures or recesses 21 in the cross ribs 18.

Recesses 23 (FIG. 3) are machined into the top side 22 of the web plate 15 which are covered off by a cover plate 24, whereby individual pockets 25 are formed that extend up to underneath the hollow spaces 20. Channels 26 constructed as throttling bores connect the pockets 25 with air supply chambers arranged underneath the web plate 15 in the wheel body (not illustrated) of the turbine rotor. Channels 27 establish a direction connection of air supply chambers with the hollow spaces 30 and 31 disposed along the profile edges 28 and 29, respectively, between the blade core 16 and the blade jacket 19.

The blade jacket 19 is provided with discharge apertures 32 for the cooling air arranged over the entire blade surface 11 corresponding to its temperature distribution, which, however, are indicated in FIG. 1 for the sake of convenience in only a single place.

In operation the cooling air enters from the air supply chambers (not shown) by way of the channel 26, in which it undergoes a first throttling effect, into the pockets 25 formed by the recesses 23 and the cover plate 24. From there, the cooling air reaches, in the axial direction of the blade 11, the individual hollow spaces 20 whereby the recesses or apertures 21 in the cross ribs 18 represent further throttling places which effect by their dimensioning the desired air distribution in the blade 11. The cooling air leaves the hollow spaces 20 through the discharge apertures 32 corresponding to the temperature distribution of the blade 11 and forms a cooling air veil about the blade jacket 19 which reduces the thermal stress of the turbine blade to a permissive value.

The cover plate 24 may be constructed, depending on the blade shape, either in one part or of two parts. It is secured by welding or brazing to the web plate 15 and is connected with the bottom edge of the blade jacket 19 in an air-tight manner. The cover plate 24 may also protrude on one side of the blade base 12 beyond the web plate 15 and form thereby a step which engages underneath the web plate of the adjoining turbine blade so that a good overlap results for the cover plates of the turbine rotor. Also several channels may lead into each recess of the web plate. The channels constructed as throttling bores may be made mechanically, electro-erosively or by electron beam boring.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. An air-cooled type turbine blade structure for mounting on a rotor having an axis of rotation, said structure comprising: root means for attaching said blade structure to the rotor, web plate means disposed radially outwardly of said root means with respect to said axis, solid blade core means disposed radially outwardly of said web plate means, blade jacket means surrounding said core means and including discharge apertures arranged over the surface thereof for discharging cooling air, a plurality of longitudinal radially extending rib means and a plurality of cross rib means interconnecting respective adjacent longitudinal rib means being arranged on the surface of said core means, said jacket means being attached to the outer edges of the respective rib means to form a set of first hollow spaces between said jacket means and the surface of said core means which are bounded by said respective rib means, channel means extending through said web plate means for communicating the radially innermost first hollow spaces between respective adjacent longitudinal rib means with cooling air supply means, and aperture means extending through said cross rib means for communicating said radially innermost first hollow spaces with first hollow spaces arranged radially outwardly thereof, said aperture means being dimensioned as throttling spaces for effecting a predetermined distribution of cooling air throughout the various first hollow spaces arranged on the surface of the blade core means, wherein said Web plate means includes recess means formed in a radially outwardly facing surface, a sheet metal member being provided for covering said recess means to form a plurality of second hollow spaces between said sheet metal member and said web plate means, each of said second hollow spaces extending to a position directly radially inwardly with respect to a respective radially innermost first hollow space such that said second spaces and said radially innermost first spaces communicate respectively with one another, said channel means extending from outside the web plate means to said second spaces, wherein each of said second spaces is connected with a separate channel forming part of said channel means for communicating cooling air from the cooling air supply means to the respective second space, and wherein the cross-sectional area of each of the respective channels is substantially less than the cross-sectional area of the respective second space connected therewith.

2. A turbine blade structure according to claim 1, characterized in that said second spaces correspond in number to the radially innermost first spaces, and in that each of said second spaces is positioned to communicate with a corresponding one of said radially innermost first spaces.

3. A turbine blade structure according to claim 2, characterized in that each of said channels is dimensioned as throttling spaces for effectiing a predetermined distribution of cooling air to the various second hollow spaces.

4. A turbine blade structure according to claim 3, characterized in that the root means, web plate means and blade core means are formed as a single solid member.

5. A turbine blade structure according to claim 1, characterized in that the radially innermost end of said blade jacket means is attached directly to said sheet metal member.

6. A turbine blade structure according to claim 3, characterized in that the radially innermost end of said blade jacket means is attached directly to said sheet metal member.

7. A turbine blade structure according to claim 5, characterized in that said first hollow spaces are in communication with one another only by way of said apertures in the cross rib means.

8. A turbine blade structure according to claim 3, characterized in that said first hollow spaces are in communication with one another only by way of said apertures in the cross rib means.

9. A turbine blade structure according to claim 1, characterized in that said web plate means includes a shoulder portion extending parallel to the axis of rotation of the rotor, said shoulder portion exhibiting a larger cross-section than either the blade core means or the root means, said channel means being arranged in said shoulder portion.

* * * * *